(12) United States Patent
Mitsui

(10) Patent No.: US 8,294,908 B2
(45) Date of Patent: Oct. 23, 2012

(54) INFORMATION PROCESSING APPARATUS, ITS JOB COMBINING METHOD, PROGRAM, AND STORING MEDIUM

(75) Inventor: Akihiro Mitsui, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1325 days.

(21) Appl. No.: 11/384,709

(22) Filed: Mar. 20, 2006

(65) Prior Publication Data

US 2006/0209330 A1     Sep. 21, 2006

(30) Foreign Application Priority Data

Mar. 18, 2005 (JP) ................................. 2005-080492

(51) Int. Cl.
*G06F 3/12* (2006.01)

(52) U.S. Cl. ...................................... 358/1.13; 358/1.15
(58) Field of Classification Search ................. 358/1.13, 358/1.15
See application file for complete search history.

(56) References Cited

U.S. PATENT DOCUMENTS

| 5,923,013 | A   | * | 7/1999  | Suzuki et al. ................. 235/375 |
| 2002/0048044 | A1 | * | 4/2002  | Kida ............................ 358/1.15 |
| 2002/0113995 | A1 | * | 8/2002  | Evans et al. .................. 358/1.15 |
| 2003/0189725 | A1 | * | 10/2003 | Kloosterman et al. ........ 358/1.18 |
| 2005/0036170 | A1 |   | 2/2005  | Okuoka et al. |
| 2005/0073709 | A1 | * | 4/2005  | Kujirai et al. ................ 358/1.14 |

FOREIGN PATENT DOCUMENTS

| EP | 1098242 A2 | * | 5/2001 |
| JP | 11-143657 A |   | 5/1999 |
| JP | 2001-134394 A |   | 5/2001 |
| JP | 2004-234510 A |   | 8/2004 |
| JP | 2005-031760 A |   | 2/2005 |
| JP | 2005-063099 A |   | 3/2005 |

* cited by examiner

*Primary Examiner* — Thomas J Lett
*Assistant Examiner* — Sunil Chacko
(74) *Attorney, Agent, or Firm* — Rossi, Kimms & McDowell LLP

(57) ABSTRACT

The invention provides an information processing apparatus which can add a job attribute of optimum print setting to a combined job without changing print settings by using a user interface upon job combination. The information processing apparatus makes the user preset the print setting which is applied upon combination of print jobs on a print setting display screen upon combination and combines the print jobs on the basis of the set print setting upon combination at the time of the combination of the print jobs.

6 Claims, 14 Drawing Sheets

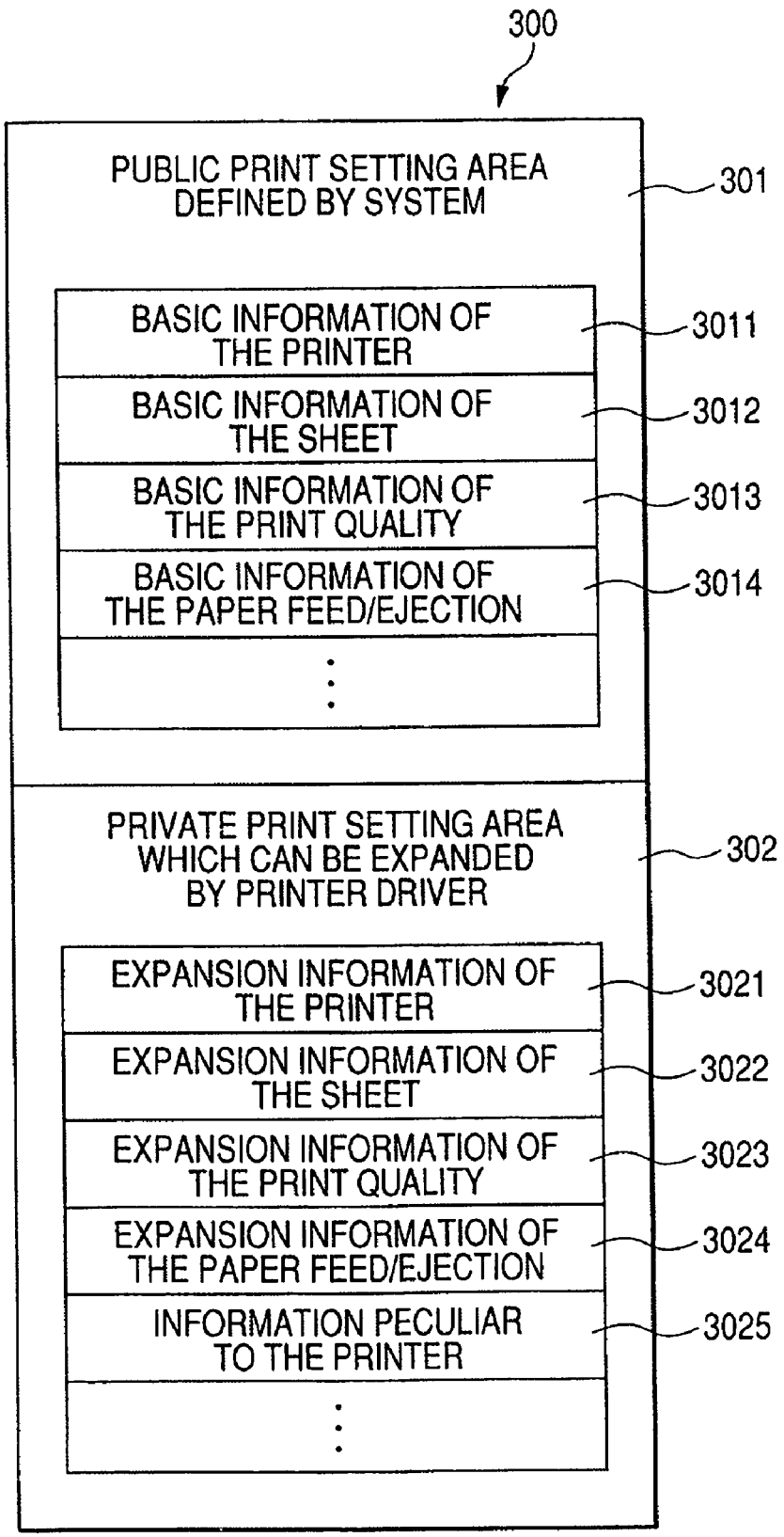

FIG. 4

```xml
<psf:JobTicket Version="1"
  xmlns:psf="http://schemas.print.com/printing/printschemaframework"
  xmlns:psk="http:// schemas.print.com /printing/printschemakeywords"
  xmlns:xsi="http://www.w 3.or g/2001/XMLSchema -instance"
  xmlns:xs="http://www.w3.or g/2001/XMLSch ema"
  xmlns:ns1="http://www.privatenamespace1.com"
  xmlns:ns2="http://www.privatenamespace2.com">

<psf:Feature name="psk:MediaSize">
    <psf:Option name="CustomMediaSize">
        <psf:Property name="psk:FeedOrienration">
            <psf:Value xsi:type="  xs:string">LongEdgeFirst</psf:Value>
        </psf:Property>
    </psf:Option>
</psf:Feature>

<psf:Feature name="psk:DocumentNUp">
    <psf:Feature name="psk:PresentationDirection">
        <psf:Option name="psk:RightBottom">
    </psf:Feature>
    <psf:Feature name="ns1:P oster">
        <psf:Option name=" ns2:Off"/>
    </psf:Feature>
</psf:Feature>

<psf:ParameterInit name="psk:PageMediaSizeMediaSizeX">
    <psf:Value xsi:type="xs:integer">10000</psf:Value>
</psf:ParameterInit>

<psf:ParameterInit nam e="psk:PageMediaSizeMediaSizeY">
    <psf:Value xsi:type="xs:integer">10000</psf:Value>
</psf:ParameterInit>

<psf:ParameterInit name="psk:PageCopyCount">
    <psf:Value xsi:type="xs:integer">1</psf:Value>
</psf:ParameterInit>

<psf:ParameterInit name= "ns1:HalfTones">
    <psf:Option name= "ns2:Gradation"/>
</psf:ParameterInit>

</psf:JobTicket>
```

400

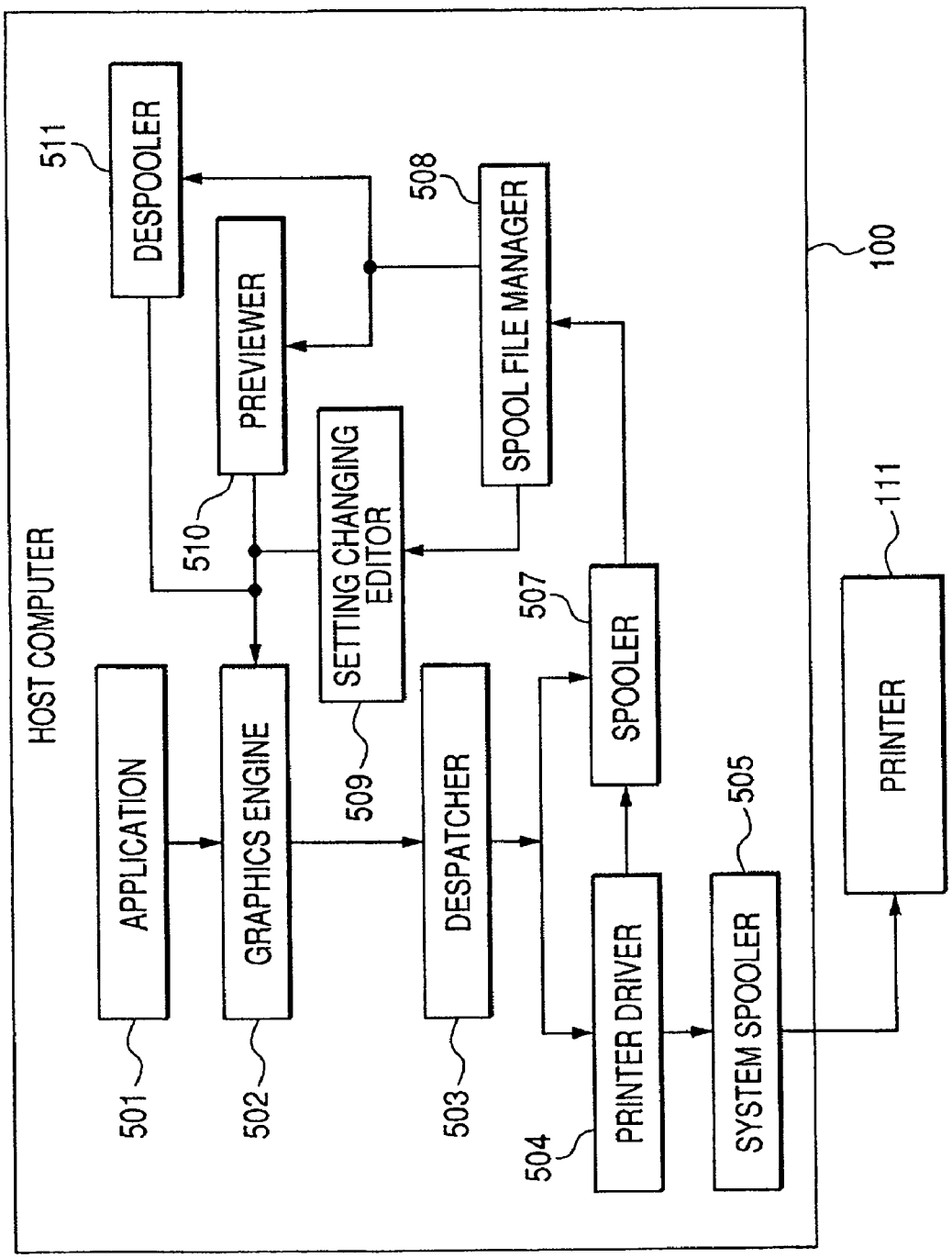

```
<psf:Feature name=" ns1:CombineJob">

<psf:Option name=" ns2:ApplyJob">
        <psf:Value xsi:type="xs:string"> Auto</psf:Value>
    </psf:Option>

<psf:Feature name=" ns2:CombinejobSettings ">
        <psf:Feature name= "ns2:CombineJobSettingsName">SETTING FOR WORD COMBINATION [2UP]</psf:Feature>
        <psf:Feature name="psk:DocumentNUp">
            <psf:Option name="psk: 2Up"/>
        </psf:Feature>
        <psf:Feature name= "ns2:ApplyCondition ">
            <psf:Option name= "ns2:ApplicationName ">
                <psf:Value xsi:type="xs:string">Word</psf:Value>
            </psf:Option>
        </psf:Feature>
    </psf:Feature>

</psf:Feature>
```

INFORMATION PROCESSING APPARATUS, ITS JOB COMBINING METHOD, PROGRAM, AND STORING MEDIUM

BACKGROUND OF THE INVENTION

1. Field of the Invention

The invention relates to an information processing apparatus, its job combining method, a program, and a storing medium and, more particularly, to an information processing apparatus for combining a plurality of jobs into one job, its job combining method, a program, and a storing medium.

2. Related Background Art

In a recent information processing apparatus having an image forming apparatus, a storing medium such as memory, HDD (Hard Disk Drive), or the like of a large capacity is equipped and a plurality of job data are held in the storing medium, thereby enabling the plurality of job data to be managed and processed. Such an information processing apparatus is provided as a computer connected to the image forming apparatus and, further, it is provided as an apparatus which has a scanner function and enables an image or a document to be read and copied, is provided as a printer which is connected to a computer through a cable, a network, or the like and prints a document, an image, or the like formed by various applications on the computer, is provided as a multifunction apparatus having a plurality of functions of them.

Among those information processing apparatuses, there is an apparatus which can print-output various jobs such as different applications and input data in a lump and there is also an apparatus provided with an application having a "collective printing" function of collectively transmitting a plurality of document data as one job to the printer, an application having a "job combining" function of combining a plurality of jobs, thereafter, performing an edition or a preview display, and print-outputting, a driver, or the like. If such a job combining function is used, it is possible to collect various kinds of data and obtain an easy-to-use printed matter as materials for a meeting or materials for presentation.

Generally, a job attribute such as print setting information or the like which is necessary when an image is formed or print-outputted by an image forming apparatus such as a printer or the like has been added to the job. The print setting information is constructed by the following plurality of print setting items: for example, an input/output sheet type; a position of a tray onto which print sheets are ejected; a construction of simplex/duplex printing; the number of print copies; a binding margin; picture quality; a copy-by-copy output; staple; setting of monochromatic/color printing; stamp; and the like.

In the job attribute, only one set of print setting information comprising a plurality of print setting items can be defined for one job and only one job attribute is given to each job.

When the jobs are combined by using the foregoing "job combining" function, if their job attributes are different, there is a case where the job attributes are contrary by a prohibition rule. For example, when a job which has been print-set so as to output only a part of the document data and a job which has been print-set so as to output ten print copies are combined, the job attribute after the job combination cannot be unconditionally set.

Therefore, as disclosed in JP-A-2001-134394, in the conventional information processing apparatus, the job attribute of one of the two jobs is used as a reference and, if the job attribute of the other job to be combined becomes a prohibition rule, a job combining process is executed by a method whereby the combination itself of those jobs is prohibited, a method whereby the job attribute of the other job is forcedly made coincide with the job attribute of the job serving as a reference, a method whereby a user interface is displayed and the user is allowed to execute an operation so as to exchange the order of the jobs, or a method whereby a part of the attribute is changed.

However, the foregoing conventional job combining method has such a problem that in the case where the combination itself of the jobs is disabled, even when only a part of the job attribute becomes a prohibition rule, the combination of the whole job becomes impossible, so that the jobs which can be combined are limited and many jobs cannot be combined.

In the case of forcedly making the job attribute of the other job coincide with the job attribute of the job serving as a reference, there is such a problem that a style of the output which is obtained as a result of the job combination is different from a user's desired style. Further, since the job attribute is forcedly made coincide, there is also such a problem that even if the user tries to add another attribute to the combined job later by using the user interface or the like, a new job attribute cannot be added or the settings become unwilling settings by the prohibition rule with the job attribute added to the job which has already been combined.

For example, in a job in which a document is printed onto a sheet of the "A3" size in the landscape direction and the short side of the sheet is designated as a binding direction and a job in which a document is printed onto a sheet of the "A4" size in the landscape direction and the longitudinal side of the sheet is designated as a binding direction, in the case of combining the jobs by making the binding directions coincident, the sheet of the "A4" size has to be rotated counterclockwise by 90° so as to be matched with the sheet of the "A3" size. Therefore, if the job attribute is forcedly made coincide and the jobs are combined, the jobs of the "A3" size and the "A4" size are combined in the directions of the sheets, so that the binding directions cannot be made coincident. If the sheets are stapled, the stapling is performed in the unwilling positions.

In the case where the user interface is displayed upon job combination and the user is allowed to execute the operation so as to exchange the order of the jobs or change a part of the attribute, the above problems can be solved. However, even in the case of combining the jobs of similar patterns, there is such a problem that the user has to operate every time and it is troublesome. For example, in the case where a job A formed by an application to form an ordinary document and a job B formed by an application to form a document in a presentation format are combined and the printing is executed as one job, if a print mode is changed to a mode of 2 pages/sheet by a page layout function and the jobs are combined, the job of a layout which can be easily seen can be formed. However, when the job combination is performed and the printing is executed, the user has to change the settings every time.

Even in the case where the most suitable layout is set when the jobs A and B are combined, its know-how cannot be stored as data. Even in the case where the binding directions are matched and the job combination is performed as mentioned above, there are cases where the user wants to combine the jobs by matching the binding directions and when the user wants to combine the jobs without purposely matching the binding directions. Therefore, the user has to confirm the types of jobs to be combined every time and combine them.

Further, there is such a problem that the previous job has already been stored in an HDD or the like in the printer and if the user wants to combine a new job with such a job, change the job attribute of the print settings, and output the job, after the user outputted the job to be combined on a computer side, he has to go to a place in front of the printer, combine such a job, change the job attribute, and output the job.

SUMMARY OF THE INVENTION

It is an object of the invention to provide a job combining method whereby, upon job combination, a job attribute of optimum print settings can be added to a combined job without changing print settings by using a user interface.

According to an information processing apparatus of the invention, a plurality of jobs can be combined into one job. This information processing apparatus comprises: a job attribute addition unit adapted to previously add print setting information which is applied upon combination of the jobs to a job attribute of the job; and a job attribute setting unit adapted to set a job attribute of the job after the combination on the basis of the print setting information added to the job attribute at the time of the combination of the jobs.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a schematic diagram showing a data structure of a DEVMODE structure;

FIG. 4 is a schematic diagram showing a data structure of a job ticket;

FIG. 5 is a diagram showing a construction of software for executing combination or the like of jobs on the print processing system;

FIG. 8 is a diagram showing an example of a job ticket of print settings upon combination which are validated when they are combined with a print job of an application for forming a document;

DETAILED DESCRIPTION OF THE PREFERRED EMBODIMENTS

Figure 1:
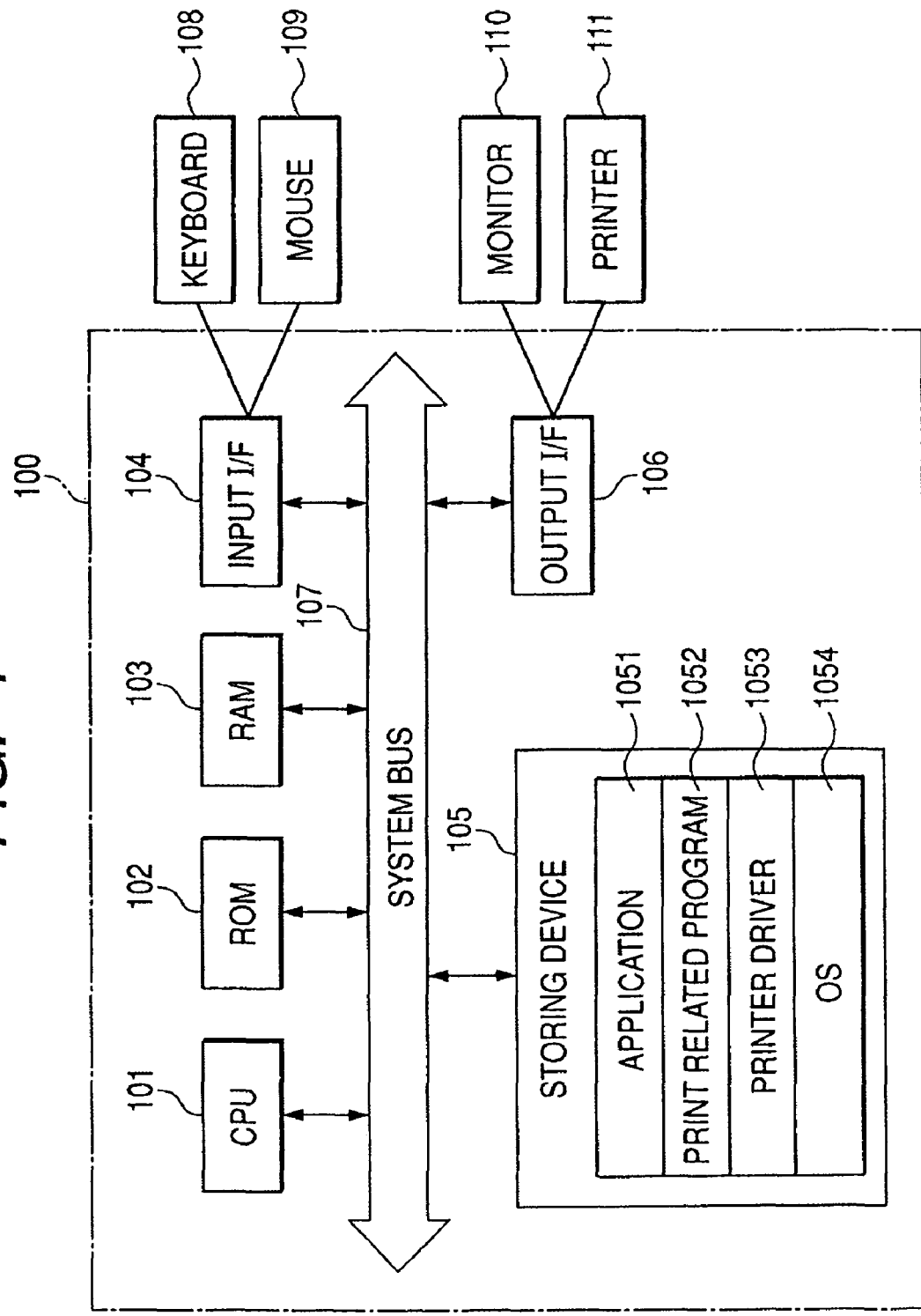
FIG. 1 is a block diagram showing a hardware construction of a print processing system to which an information processing apparatus according to an embodiment of the invention is applied.

Embodiments of the invention will be described in detail hereinbelow with reference to the drawings. FIG. 1 is a block diagram showing a hardware construction of a print processing system to which an information processing apparatus according to an embodiment of the invention is applied.

In FIG. 1, the print processing system is constructed by: a host computer 100 (information processing apparatus); and a keyboard 108, a mouse 109, a monitor 110 (display) as a display apparatus, and a printer 111 (image forming apparatus) as a printer device which are connected to the host computer 100.

The host computer 100 has: a CPU 101; a ROM 102; a RAM 103; an input interface (I/F) 104; a storing device 105 comprising a hard disk or the like; and an output I/F 106. The CPU 101 controls the whole apparatus in accordance with programs stored in the ROM 102, RAM 103, or storing device 105. The RAM 103 is also used as a work area when the CPU 101 executes various processes.

The storing device 105 has: an application program (hereinafter, simply referred to as an "application") 1051; a print related program 1052; a printer driver 1053; and an operating system (OS) 1054.

The keyboard 108 and the mouse 109 are input devices which are used by the user to give various instructions to the host computer through the input I/F 104. The output I/F 106 is an interface for outputting data to the outside. The output I/F 106 outputs the data to the monitor 110 or the printer 111. A system bus 107 is a common data bus for connecting the respective units such as CPU 101, ROM, and the like and is used for transmission and reception of the data of the respective units.

The print processing system may be also a sole apparatus or a system comprising a plurality of apparatuses so long as the functions of the invention are executed. Naturally, the invention can be applied to a system in which a plurality of apparatuses are mutually connected through a network such as LAN (Local Area Network), WAN (Wide Area Network), or the like.

Figure 2:
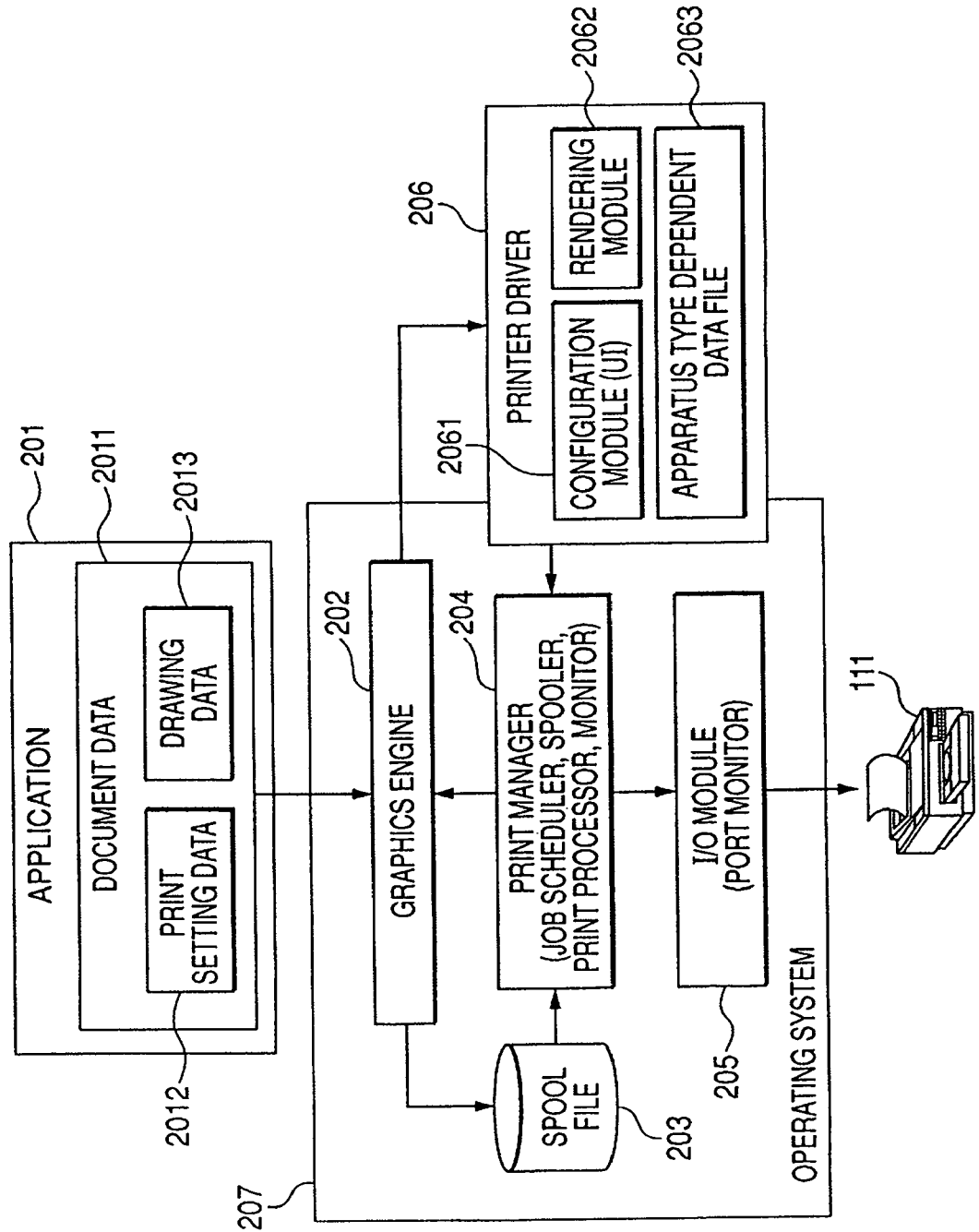
FIG. 2 is a diagram showing a schematic construction of software which operates on the print processing system in FIG. 1.

FIG. 2 is a diagram showing a schematic construction of software which operates on the print processing system in FIG. 1. In the diagram, only the component elements necessary for the invention are shown and the other component elements are omitted.

In FIG. 2, an application 201 corresponds to the application 1051 in FIG. 1, an operating system 207 corresponds to the operating system 1054 in FIG. 1, and a printer driver 206 corresponds to the printer driver 1053 in FIG. 1, respectively.

The operating system 207 has: a graphics engine 202; a spool file 203; a print manager 204 constructed by a job scheduler, a spooler, a print processor, a monitor, and the like; and an I/O module 205 serving as a port monitor.

The user activates the application 201, forms document data 2011 by operating the keyboard 108, mouse 109, and the like, and instructs the host computer 100 to print the document data 2011. When the printing is instructed by the user, the application 201 understands the print instruction, selects the printer driver 206 corresponding to the printer 111 to execute the printing on the basis of print setting data 2012 which has been set for the document data 2011 or drawing data 2013 serving as document contents, and thereafter, notifies the operating system 207 of the printing process of the document data 2011.

In the operating system 207, the graphics engine 202 sends the notified document data 2011 to the spool file 203 and the printer driver 206. The printer driver 206 converts the received document data 2011 into a data language which can be understood by the printer 111.

The print manager 204 makes a schedule management of the printing processes which are notified from a plurality of applications. When the printer 111 enters the state where the printing can be executed, the print manager 204 transmits the print job data to the printer 111 through the I/O module 205 and allows the printer 1.11 to execute the printing process.

When the printer driver 206 receives the document data 2011 including the print setting data 2012, initial values of the print settings are formed by a configuration module 2061 (UI) and the print settings are set by the user interface of the application 201 or the configuration module 2061 so as to obtain a final print result which the user desires.

The print setting data 2012 has two kinds of formats: one is a data structure of a binary data format called "DEVMODE"; and the other is text data of an XML (extensible Markup Language) format of a markup language using a tag called a "job ticket". Those formats differ depending on the specifications of the printer driver 206 and the operating system 207.

FIG. 3 is a schematic diagram showing a data structure of the DEVMODE structure.

In FIG. 3, a DEVMODE structure 300 mainly comprises two print setting areas: one is an area for setting common basic information which has been defined by the operating system and is called a "public area" 301; and the other is an area in which the print settings can be freely expanded by each printer driver and is called a "private area" 302.

The following information is set in the public area 301: basic information 3011 of the printer where a device name and a memory size of the whole structure are stored; basic information 3012 of the sheet where a size, a width, a height, and the like of the sheet are stored; basic information 3013 of print quality where color/monochromatic, resolution, and the like are stored; basic information 3014 of the paper feed/ejection where information showing from which cassette the sheets are fed, information showing in which order the sheets are ejected upon paper ejection, and the like are stored; and the like.

In the private area 302, further detailed information of the basic information set in the public area 301 and information which cannot be set by the basic information are stored as: expansion information 3021 of the printer; expansion information 3022 of the sheet; expansion information 3023 of the print quality; and expansion information 3024 of the paper feed/ejection. As information which cannot be set by the basic information in the public area 301, for example, information 3025 peculiar to the printer, information possessed by middleware (not shown) and the like can be mentioned.

Figure 11:
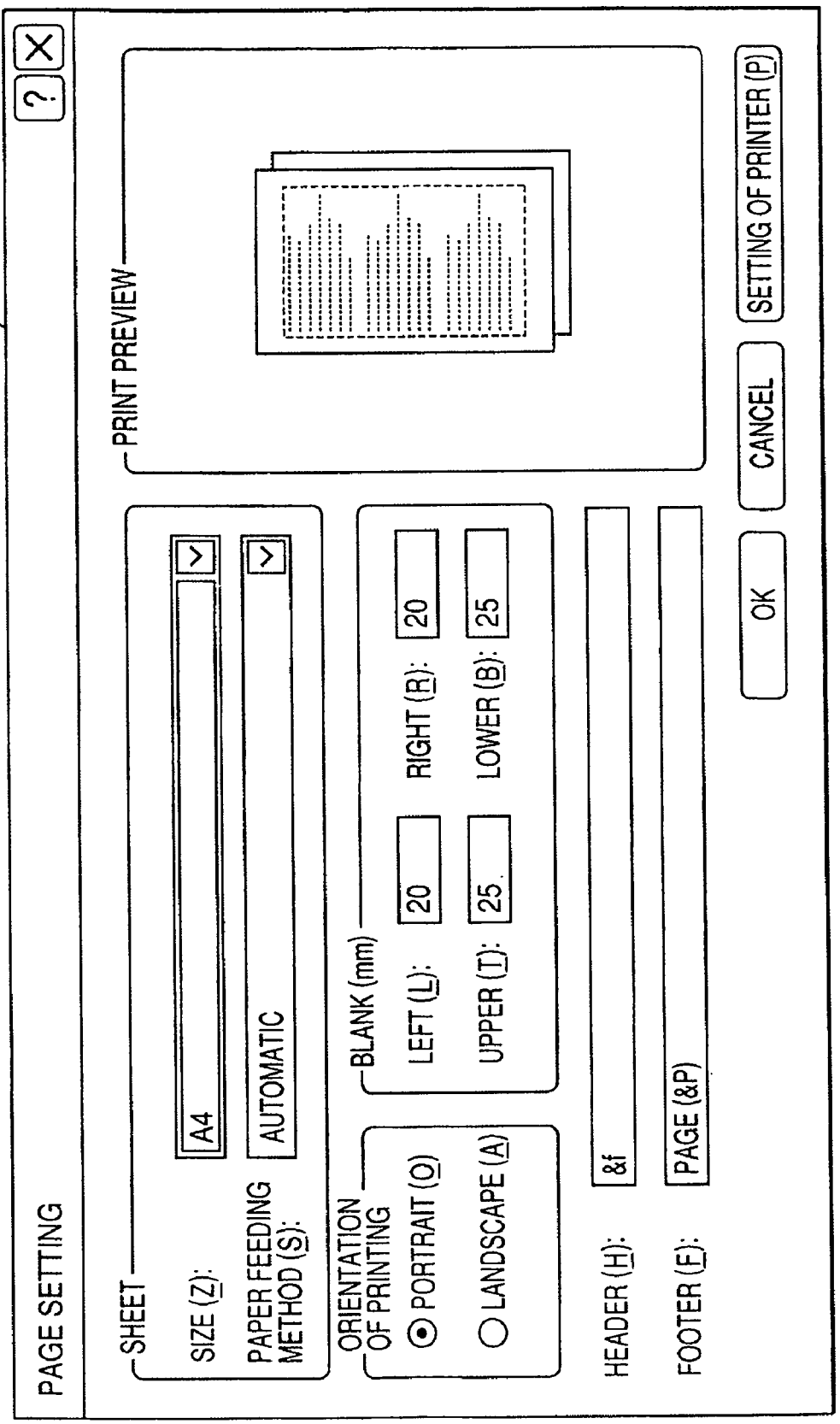
FIG. 11 is a diagram showing a page user interface for changing the print settings.

The contents shown by the information stored in the public area 301 have widely been opened as a format of the operating system and the settings can be changed from any application. The setting change can be made from a page setting display screen 1000 as a graphical user interface (GUI) for page setting shown in FIG. 11 which is displayed by the operating system or the application.

Figure 12:
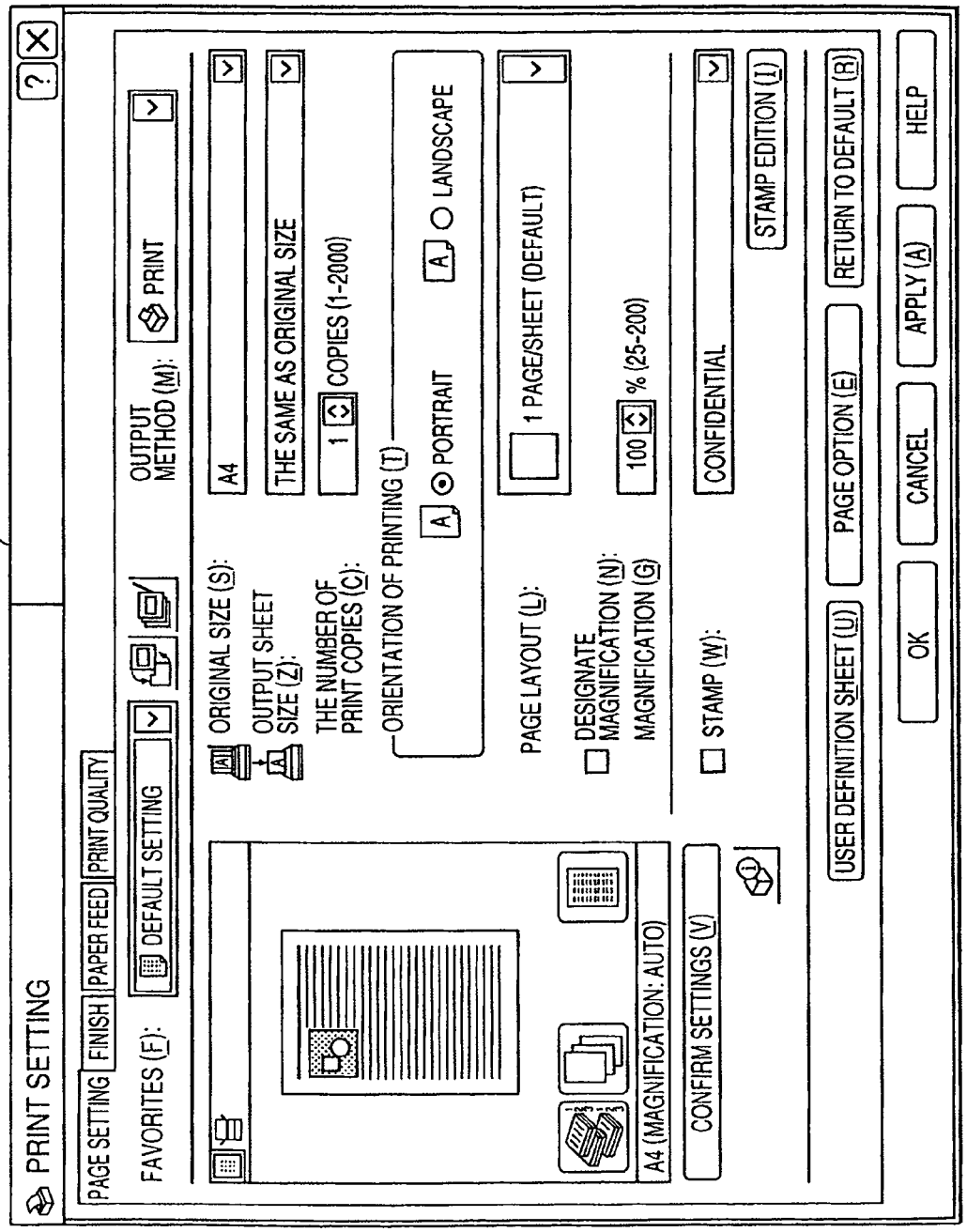
FIG. 12 is a diagram showing a user interface for changing the print settings of a private area or an expansion name space.

In the private area 302, since the print settings can be freely expanded by the printer driver, they can be set only by the printer driver. Therefore, the configuration module 2061 of the printer driver 206 displays a print setting display screen 1100 as a GUI for print setting shown in FIG. 12. The user can change the print settings in the private area 302 by using such a GUI.

FIG. 4 is a schematic diagram showing a data structure of a job ticket.

In FIG. 4, a job ticket 400 has a public area and a private area in a manner similar to the DEVMODE structure 300. However, since the job ticket 400 is described in the XML format, such an area division made by a boundary line like a DEVMODE structure 300 is not performed in the job ticket 400. Both of them are distinguished by name spaces. The name spaces are designated by their tags as a prefix. A tag which does not have the prefix is handled as a tag which does not belong to the name spaces. The prefix is added before a colon (:) symbol. For example, it is described like "psf:Feature".

Six name spaces exist in the job ticket 400 and play different roles, respectively. For example, a psf name space is a print schema frame work in which a frame work of the job ticket is defined. To provide the structure which is satisfied as a job ticket, basic tags such as "Feature", "Option", and "Value" are defined. "Feature" is defined in a form of functions such as device attribute, job format setting, other related features, and the like. "Option" is defined in a form annexed to the functions. "Value" is defined in a form of values of elements. "ParameterInit" is defined in a form of setting of initial values with the definition of the values of the elements.

In the psk name space, keywords of the job ticket in the public area are defined. As specific keywords, there are the following items: "MediaSize" to designate a size of sheet; "DocumentNUp" to designate nUP setting for printing a plurality of pages into one page; "PageCopyCount" to set the number of print copies; and the like.

The psf name space and the psk name space are defined in a general open form called a "schemer" by the operating system and data can be freely arranged by the application on the basis of the definition. An xsi name space and an xs name space are generally defined as standards of an XML schemer. In the xsi name space, an assembly attribute/instance of the XML schemer is defined. In the xs name space, the specified attribute of the XML schemer is defined. Each of an ns1 name space and an ns2 name space is an expansion name space which has uniquely been expanded by the printer driver.

A software construction in which the print processing system in FIG. 1 is expanded and the combination of a plurality of print jobs, the preview display, and the change in job attribute of the print settings are enabled by using the printer driver 206 will now be described with reference to FIGS. 2, 5, and 6. Such a mechanism is called an "edition+preview" function as an expansion function of the printer driver 206.

FIG. 5 is a diagram showing the construction of software for executing the combination or the like of jobs on the print processing system. FIG. 6 is a diagram showing a job management display screen 600 as a GUI for making job management on the printer driver 206.

In FIG. 5, the host computer 100 has: an application 501 corresponding to the application 201 in FIG. 2; a graphics engine 502 corresponding to the graphics engine 202 in FIG. 2; a despatcher 503 as one module in the printer driver 206; a printer driver 504 corresponding to the printer driver 206 in FIG. 2; a system spooler 505; a spooler 507; a spool file manager 508; a setting changing editor 509; a previewer 510; and a despooler 511.

First, after the user formed the document data 2011 by the application 501, in order to use the "edition+preview" function, he selects "edition+preview" as an output method on the display screen which is displayed by the configuration module 2061. The setting of the "edition+preview" function is stored into the private area 302 in the DEVMODE structure 300 of the print setting data 2012 added to the document data 2011 or into an expansion name space (ns1 name space, ns2 name space) in the job ticket 400. In this state, the printing process is executed on the system of FIG. 5.

When a printing process of the document data 2011 is requested by the application 501, the document data 2011 is sent to the despatcher 503 through the graphics engine 502. The despatcher 503 which received the document data 2011 checks the private area 302 in the DEVMODE structure 300 of the print setting data 2012 added to the document data 2011 or the expansion name space in the job ticket 400 in order to confirm whether or not the "edition+preview" function has been selected.

Subsequently, when the "edition+preview" function has been selected, the despatcher 503 distributes the print job of the document data 2011 to the spooler 507. When it is not selected, the despatcher 503 distributes the print job to the printer driver 504 in a manner similar to the ordinary printing process. Since the "edition+preview" function has been selected here, the processing routine advances to the process in the spooler 507. The spooler 507 forms the spool file 203 and sends it to the spool file manager 508. The spool file 203 has the print setting data 2012 and the drawing data 2013 as one print job.

The spool file manager 508 has a queue structure (queue) to manage a plurality of print jobs and inputs the received print job into the queue. The queue structure is a data structure having a feature that the data which has been inputted first is outputted first. For example, the queue structure is a structure like a line of people waiting for rides in an amusement park. When the data is inputted, this data is arranged at the end of the data sequence and when the data is outputted, it is sequentially outputted from the oldest data.

Figure 6:
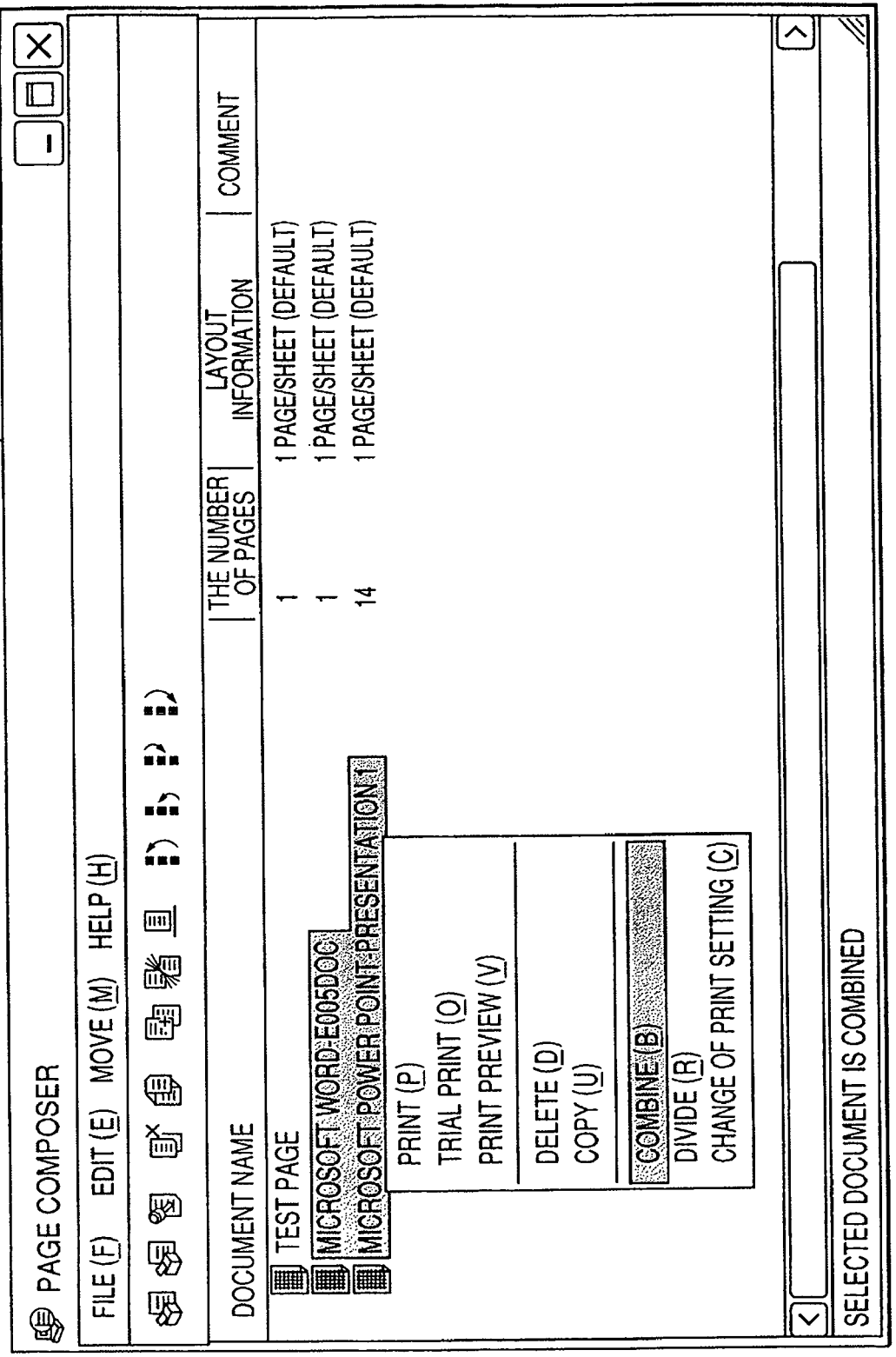
FIG. 6 is a diagram showing a user interface for making job management on a printer driver 206.

The spool file manager 508 displays the print jobs inputted to the queue as a list and can manage them on the job management display screen 600 shown in FIG. 6. The job management display screen 600 is pop-up displayed. The user can select a desired print job from the print jobs displayed on the list and execute the process such as preview display, deletion or copy of the print job, combination or division of the print jobs, change in the print settings, or the like. It is also possible to preset by the printer driver so that the job management display screen 600 is not displayed.

When "change of print setting" is selected from a dropdown list which is displayed in correspondence to the print job selected on the job management display screen 600, the setting changing editor 509 is activated and the user can change the job attribute of the print settings.

When "print preview" is selected from the drop-down list, the previewer 510 is activated and an actual print image of the print job is formed and preview-displayed. The preview display of the print image which is formed by the previewer 510 can be drawn onto the monitor 110 by using the graphics engine 502 instead of the printer driver 504.

When a plurality of print jobs are selected on the job management display screen 600 and "combine" or "divide" is selected from the displayed drop-down list, the spool file manager 508 can combine or divide those print jobs.

When the print request for the print jobs is executed by the spool file manager 508, the despooler 511 is activated and the despooler 511 makes a print request to the graphics engine 502 and executes the drawing process in a manner similar to the case where the application 501 made the print request to the graphics engine 502. At this time, since the despooler 511 cancels the "edition+preview" set in the job attribute of the print settings and executes the printing, the situation where the processing routine is returned to the spool file manager 508 again and an infinite loop is repeated does not occur. The despatcher 503 sends the print job to the printer driver 504, the print job is transmitted through the system spooler 505, and the printing process is executed by the printer 111.

Although the print processing system uses the construction in which the printer driver is expanded and the spool file is uniquely managed, it is also possible to use a construction in which the printer 111 manages and operates the received print job by using a storage such as an HDD or the like equipped for the printer 111 itself. At this time, if there is a user interface which is used upon combination of the print jobs, it is displayed on a display panel (not shown) of the printer 111.

It is also possible to use a mechanism in which a print server (not shown) receives the print job from a client computer (not shown) and manages and operates the received print job by using the storage in a manner similar to the printer 111. In this instance, if there is a user interface which is used upon combination of the print jobs, it is displayed as a job management display screen or a Web display screen which is displayed on a display apparatus of the print server. As mentioned above, it is sufficient that the system which can manage the print job is equipped in an arbitrary position in the whole print processing system.

Figure 7:
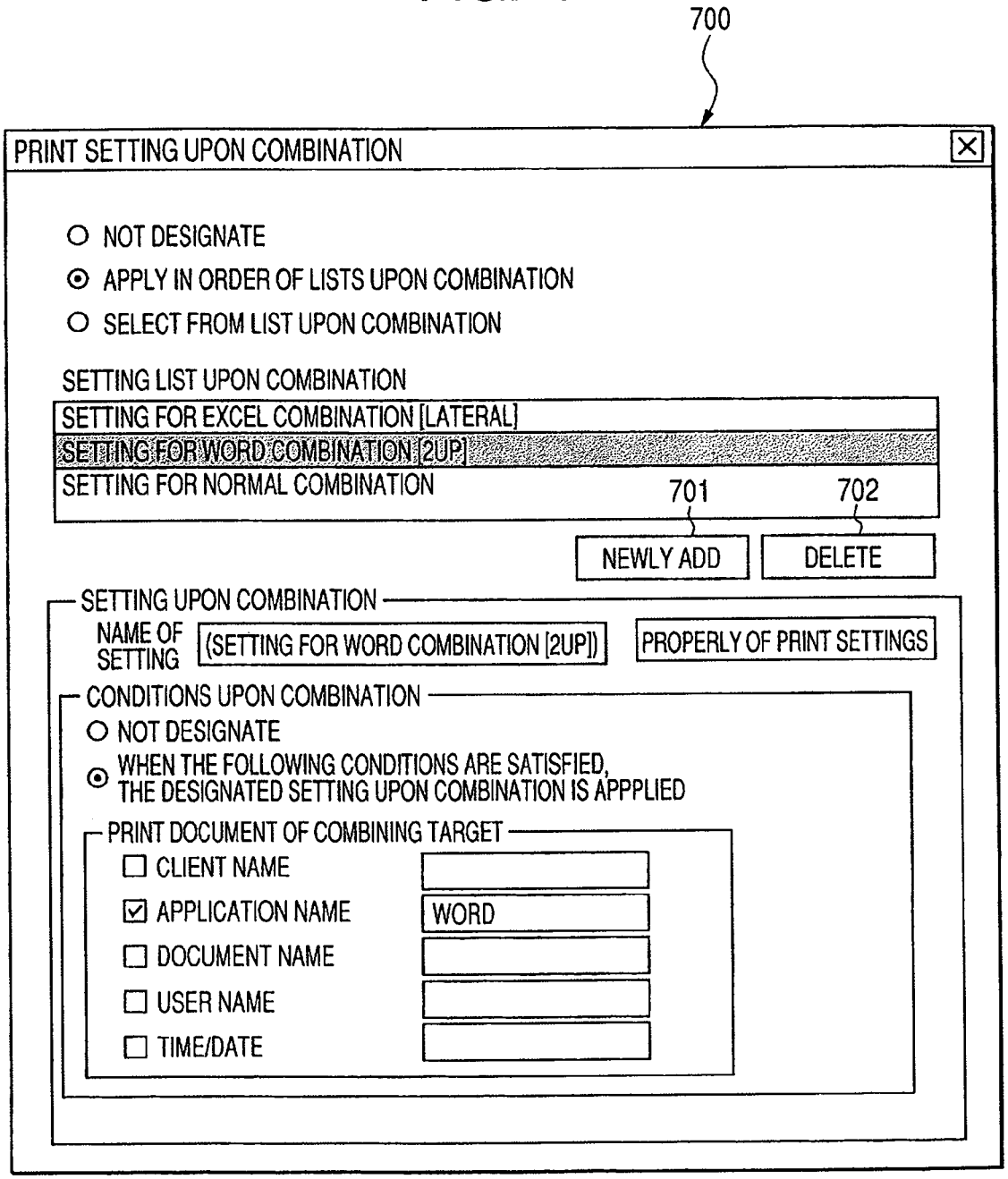
FIG. 7 is a diagram showing a print setting display screen upon combination for adding print settings which are applied upon print job combination to a print job before the combination.

FIG. 7 is a diagram showing a print setting display screen upon combination for adding print settings which are applied upon print job combination to a print job before the combination.

The print setting upon print job combination is simultaneously executed when the print setting data 2012 is set after the user formed the document data 2011 by the application 501. The print setting upon print job combination is print setting which is applied only when the print jobs are combined. It is not applied when the normal printing process is executed without executing the job combination.

When the print setting upon print job combination is executed, the DEVMODE structure 300 or the job ticket 400 has uniquely been expanded by the printer driver on the system different from the ordinary print setting. Therefore, the print setting upon print job combination is stored into the private area or the area of the expansion name space.

The print setting upon print job combination is set by the user on a print setting display screen 700 upon combination in FIG. 7. In a manner similar to the normal print setting display screen, the print setting display screen 700 upon combination is displayed beside the print setting dialog by the configuration module 2061 of the application 501 or the printer driver 504.

In FIG. 7, "name of setting", "setting list upon combination", and "conditions upon combination" can be set on the print setting display screen 700 upon combination.

With respect to "name of setting", since a plurality of print settings upon combination can be set for one print job, the user can allocate unique names such as "setting for Word combination" to those print settings in order to distinguish them.

"setting list upon combination" shows "print setting upon job combination" which is applied only at the time of the job combination. The job attribute of the print settings upon job combination can be formed by using the print setting display screen 1100 in FIG. 12 which is displayed by the UI of the printer driver 504. This "print setting" is a job attribute of the special print setting which is applied only at the time of the job combination and is not a job attribute of the print settings which are applied to the ordinary printing. A plurality of print settings can be set for one print job and are managed as "setting list upon combination". In "setting list upon combination", the print setting in the upper order has a higher priority.

"conditions upon combination" are conditions to decide whether or not "print setting upon job combination" is applied in accordance with a type or the like of the print job serving as a combination target when the job combination is performed. As conditions upon combination, the following cases can be set: the case where the print job serving as a combination target has been formed by a specific client computer ("client name"); the case where it has been formed by a specific application ("application name"); the case where a specific file name has been added to such a print job ("document name"); the case where it has been formed by a specific user ("user name"); the case where it has been formed at specific time/date ("time/date"); and the like. The conditions upon combination can be formed by combining those various items.

When a new addition button 701 is clicked on the print setting display screen 700 upon combination, the setting name inputted to the column of "name of setting" is registered into "setting list upon combination". The set print setting upon job combination is added to the DEVMODE structure 300 or the job ticket 400. When a delete button 702 is clicked, the print setting upon print job combination selected on the "setting list upon combination" is deleted.

On the print setting display screen 700 upon combination, a mode in which the print setting upon print job combination is not formed can be also designated by marking a "not designate" check box. Even in the case of forming the print setting upon job combination, a mode in which the print settings upon job combination are automatically applied can be also designated by marking a "apply in order of list upon combination" check box. By marking a "select from list upon combination" check box, the spool file manager 508 displays the print setting display screen 700 upon combination and a mode for allowing the user to select the desired print setting from the print settings upon job combination displayed on the "setting list upon combination" can be also designated.

Subsequently, the combining operation of the print job formed by the application which can form a document in the presentation format and the print job formed by the application for forming the ordinary document will now be described.

First, the user sets the "edition+preview" function, by the user interface of the printer driver in order to combine the print job. Subsequently, as print settings upon print job combination for the document data in the presentation format, "apply in order of list upon combination" is selected on the print setting display screen 700 upon combination and three settings upon combination ("name of setting", "print setting", and "conditions upon combination") are formed.

FIG. 8 is a diagram showing an example of a job ticket of print settings upon combination which are validated when they are combined with a print job of the application for forming the document.

In FIG. 8, "apply in order of list upon combination" selected on the print setting display screen 700 upon combination has been stored as a value of "Auto" of an option of an "ApplyJob" keyword and the print settings upon combination are listed up after that.

"print setting" upon print job combination is described in a portion surrounded by tags "CombineJobSettings". "name of setting" is described as a "CombinejobSettingsName" keyword. The print setting data 2012 of 2 pages/sheet (2UP) formed by clicking "property of print setting" is described as "DocumentNup". "conditions upon combination" is described as "ApplyCondition". By presuming the case where the document data as a combination target has been formed by the document forming application, a name of the document forming application is described as an "ApplicationName" keyword.

The operating process of the spool file manager 508 when the document data of the presentation format, that is, the document data having "print settings" upon print job combination is printed will now be described with reference to FIGS. 9 and 10.

Figure 9:
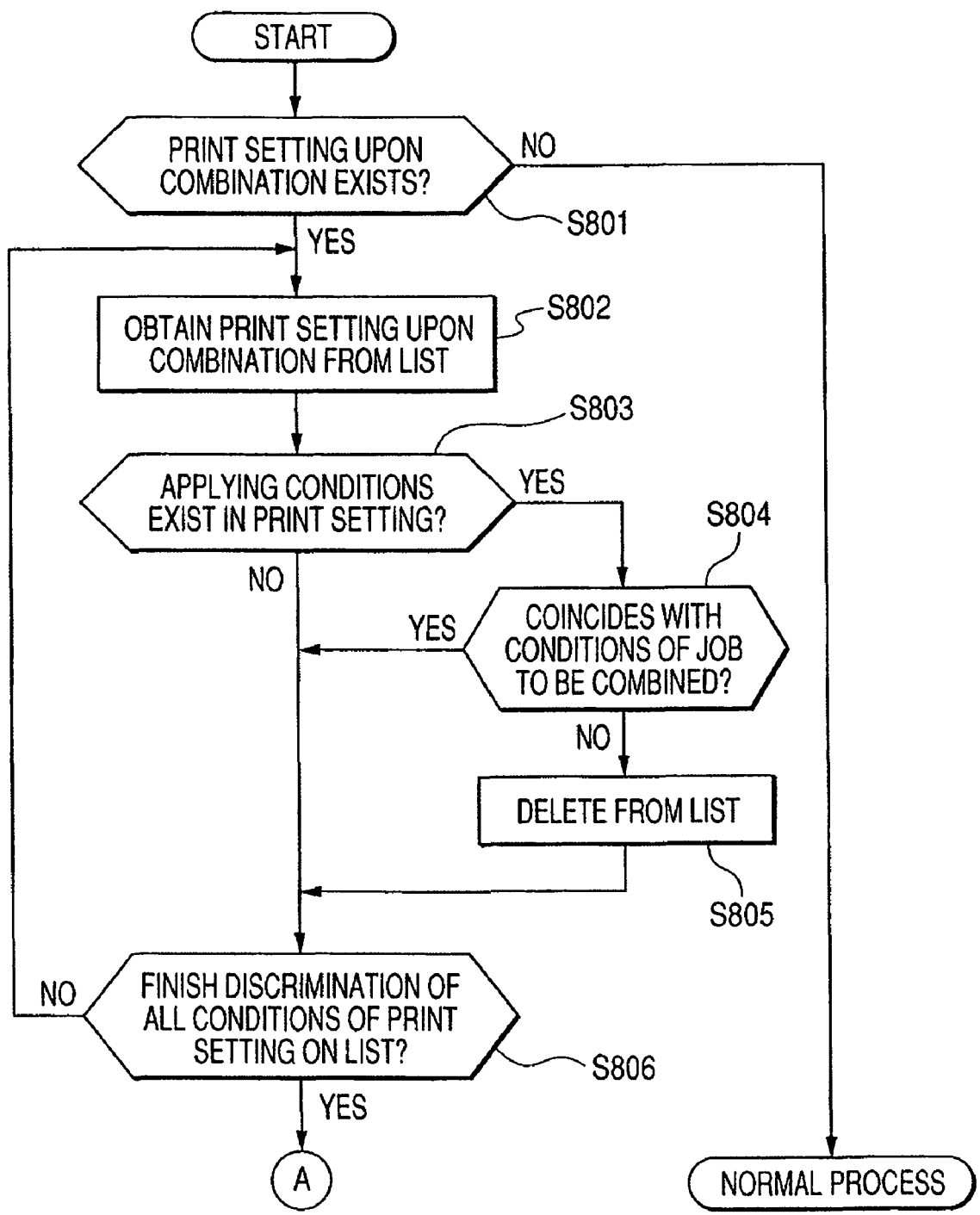
FIG. 9 is a flowchart showing an operating process of a spool file manager 508 when the print job having the print settings upon print job combination is executed.
Figure 10:
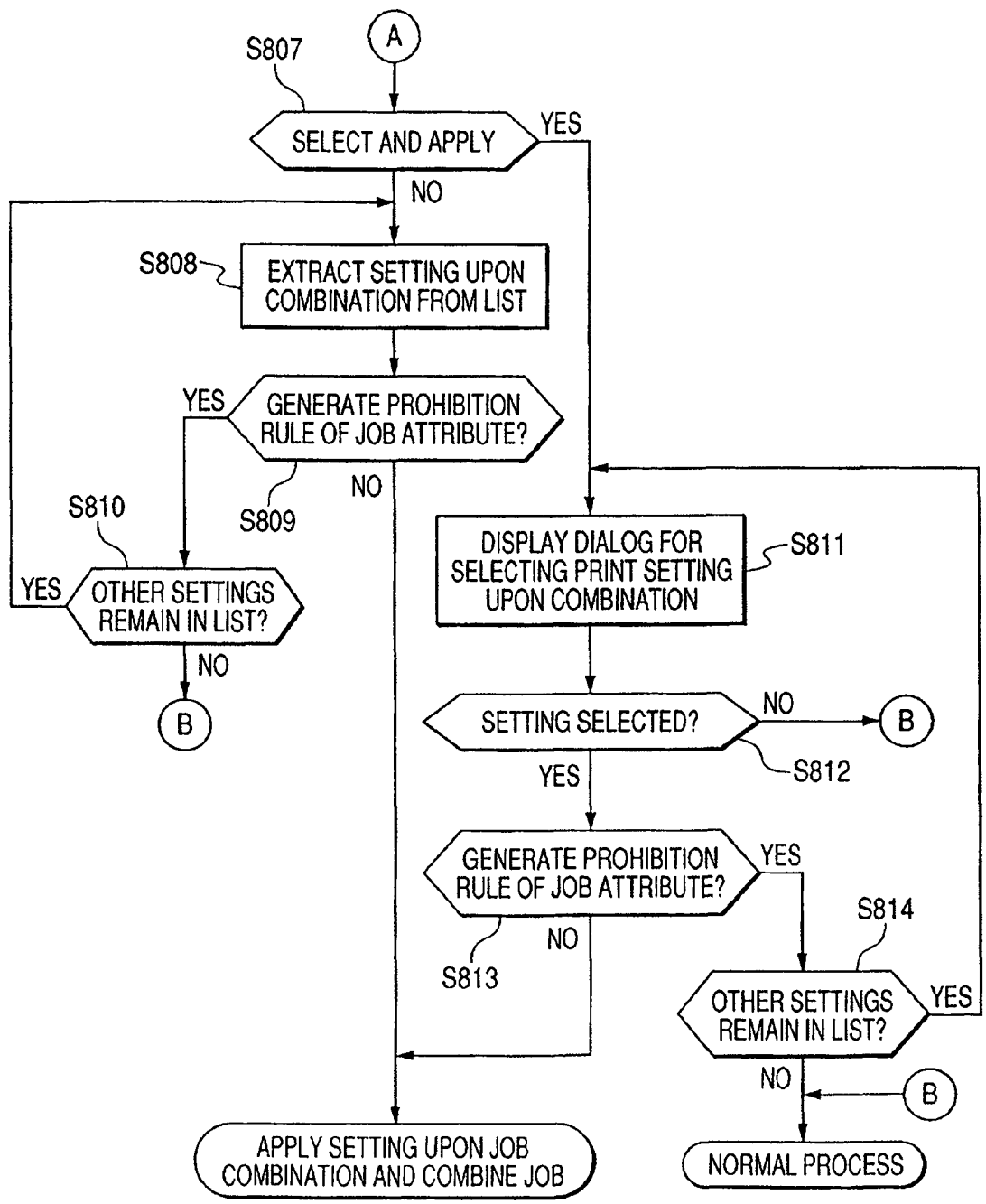
FIG. 10 is a flowchart showing the operating process of the spool file manager 508 when the print job having the print settings upon print job combination is executed.

FIGS. 9 and 10 are flowcharts showing the operating process of the spool file manager 508 when the document data having the print settings upon print job combination is printed. As a prerequisite of this process, it is assumed that in order to perform the job combination, the "edition+preview" function has preliminarily been selected and the spool file manager 508 receives the print job at the time of executing the printing.

When the spool file manager 508 receives the print job as a spool file 203 from the spooler 507, it inputs this print job into the queue and discriminates whether or not "print setting upon print job combination" exists in this print job (step S801). If "print setting upon print job combination" does not exist as a result of the discrimination, the processing routine advances as it is to the normal process.

If "print setting upon print job combination" exists, by referring to "setting list upon combination" in "print setting upon print job combination", one of the print settings upon job combination (print setting data) is obtained from such a list (step S802). Whether or not an applying condition ("conditions upon combination") exists in the obtained print setting is discriminated (step S803).

If the applying condition exists in the obtained print setting as a result of the discrimination of step S803, whether or not the applying condition coincides with "conditions upon combination" of the print job to be combined is discriminated (step S804) with respect to all print jobs in the print job list (FIG. 6) which can become a combination target. When it does not coincide as a result of the discrimination, the print job is deleted from the list of "print settings upon combination" (step S805) and step S806 follows. For example, although the condition discrimination has been made with respect to "setting for Excel combination [lateral]" shown in FIG. 7, since the print job (serving as a combination target) formed by an application for Excel does not exist in the print job list, such a print job is deleted from the list of "print settings upon combination". If the applying condition coincides as a result of the discrimination of step S804, step S806 directly follows.

In step S806, whether or not the condition discrimination has been finished with respect to all of the print settings on the list of "print settings upon combination" is discriminated in step S806. If it has been finished, the processing routine advances to step S807 in FIG. 10. If it is not finished, the processing routine is returned to step S802 and next one of the print settings upon print job combination is obtained from the list of "print settings upon combination". For example, in the condition discrimination about next "setting for Word combination [2UP], since the print job (serving as a combination target) formed by an application for Word exists in the print job list, such a print job is left as it is. Since "setting for normal combination" included in the list of "print settings upon combination" is left as it is since the condition upon combination does not exist.

In FIG. 10, whether a mode in which the print setting which can be applied to the print job after the combination is automatically selected from the print settings upon combination left on the list or a mode in which the list of "print settings upon combination" is displayed and the user is made to select the print setting has been set is discriminated (step S807). If the mode for automatically selecting has been set as a result of the discrimination (NO in step S807), the print setting upon print job combination is extracted from the list of "print settings upon combination" (step S808).

Subsequently, a prohibition rule discrimination in the case where the job has been combined with the print job serving as a combination target is made and whether or not the prohibition rule of the job attribute has been generated is discriminated (step S809). In this step, whether or not there is a case which becomes a problem if the jobs are combined and the print settings upon combination are applied in the case where the numbers of print copies set in the print jobs to be combined are different or the stapling process has been performed to only one of the print jobs is discriminated. If there is no problem here (No in step S809), "print setting upon print job combination" is applied and the job combination is automatically performed.

Figure 14:
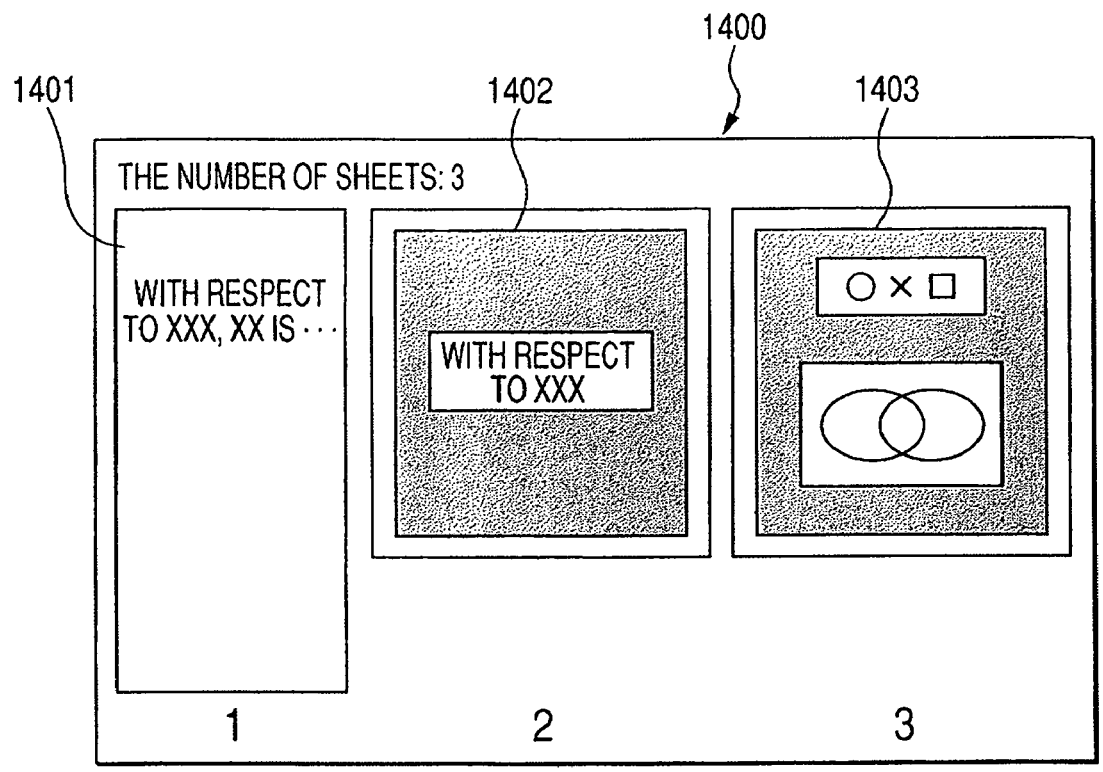
FIG. 14 is a diagram showing a preview display by a previewer in the state where a print job formed by an application for a document and a print job formed by an application for a presentation are combined as an ordinary job combining process.
Figure 15:
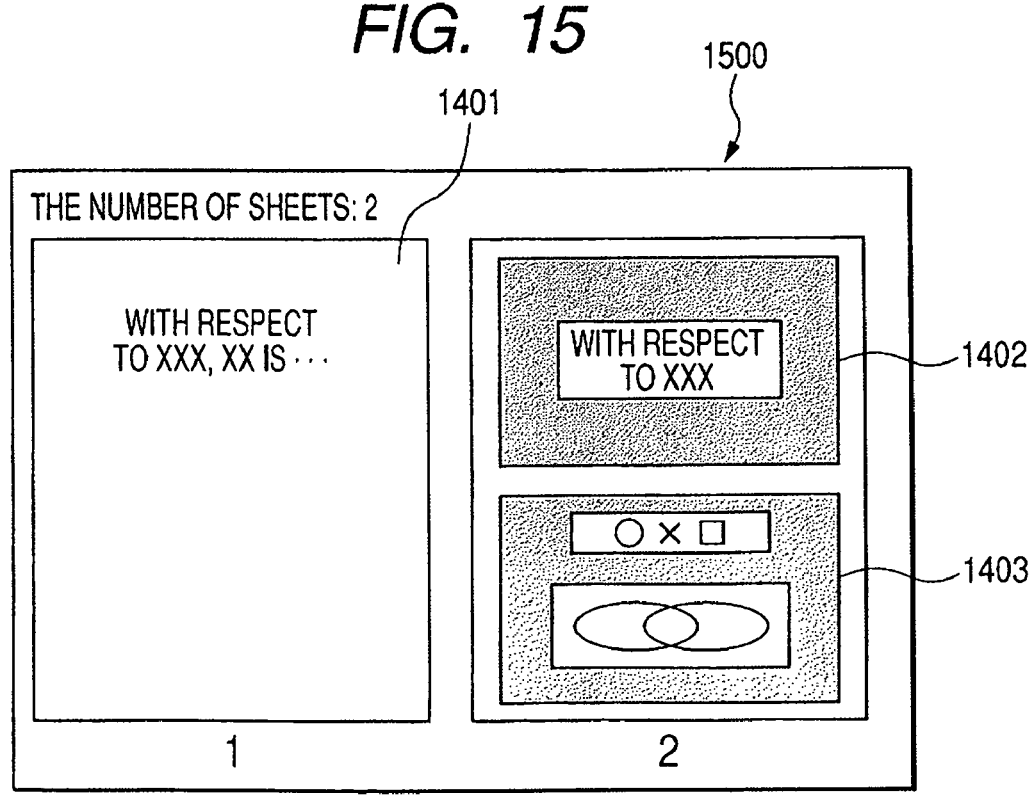
FIG. 15 is a diagram showing a preview display by the previewer in the state where the print job formed by the application for the document and the print job formed by the application for the presentation are combined by applying the print settings upon job combination as a job combining process in the embodiment.

When the print job formed by the document forming application is combined with the print job formed by the application for presentation, the job combination is generally performed in a form shown in FIG. 14. However, according to the above processes, the setting of 2 pages/sheet shown in FIG. 15 is automatically applied and the job combination is performed.

If the prohibition rule of the job attribute has been generated as a result of the discrimination of step S809 and the job combination cannot be performed (YES in step S809), whether or not other settings remain in the list of "print settings upon combination" is discriminated (step S810). If they remain, the processing routine is returned to step S808, the next print setting is obtained, and the prohibition rule discrimination of the job attribute is made. If they do not remain as a result of the discrimination of step S810, the processing routine advances to the ordinary process and the automatic job combining process is not executed.

Figure 13:
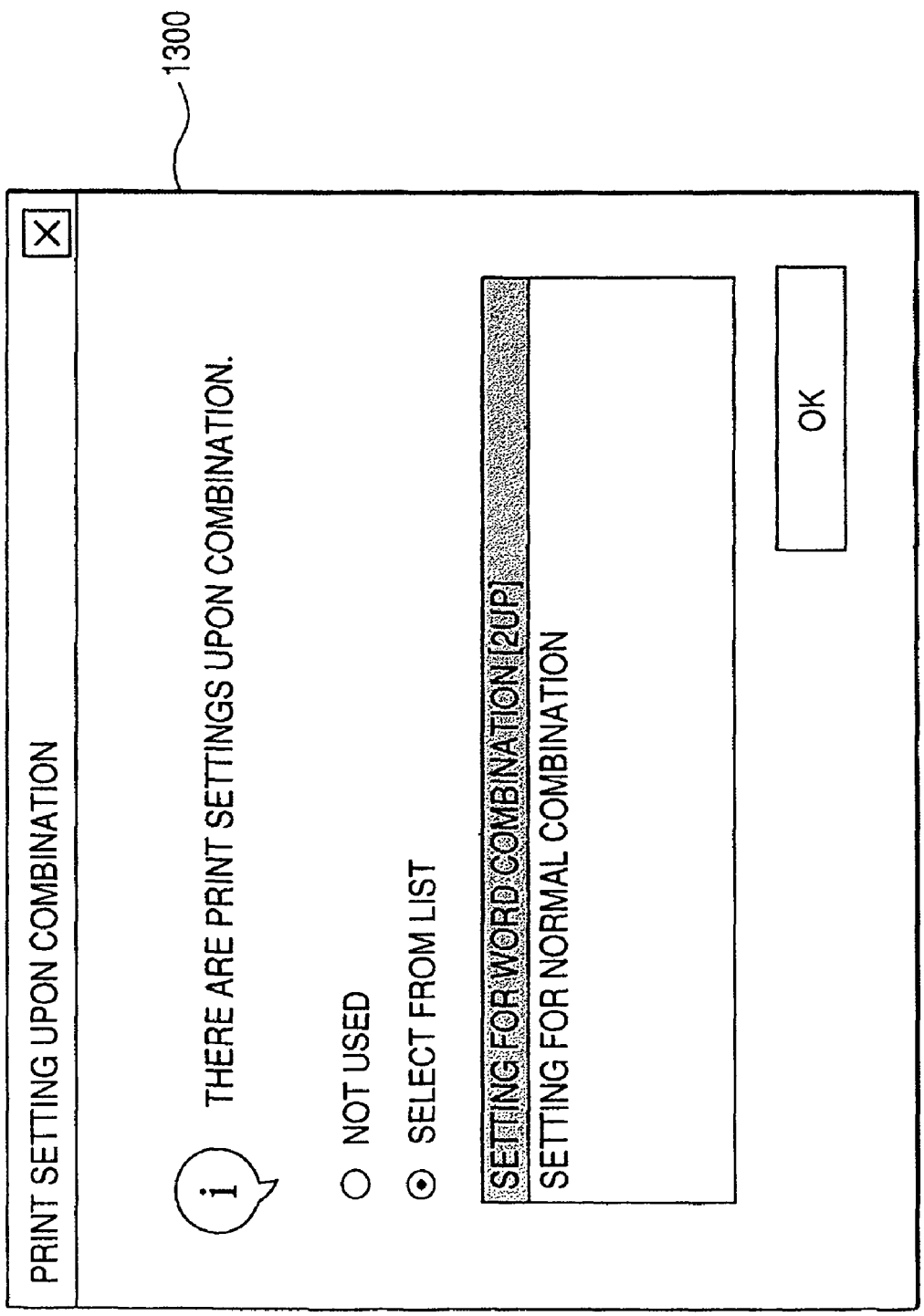
FIG. 13 is a diagram showing a user interface dialog for allowing the user to select the print settings upon print job combination.

If "select from list upon combination" has previously been selected as "print settings upon combination" as a result of the discrimination of step S807 (YES in step S807), a user interface dialog 1300 (FIG. 13) for making the user select the print setting from the list of "print settings upon combination" is displayed (step S811).

Subsequently, whether or not the user has selected the print setting on the user interface dialog 1300 is discriminated (step S812). If the user selects "print settings upon combination", the prohibition rule discrimination of the job attribute is made (step S813). Thus, the prohibition rule of the job attribute has been generated and the job combination cannot be performed (YES in step S813), the setting selected from the list of "print settings upon combination" is deleted. If the settings still remain on the list (YES in step S814), the user interface dialog 1300 is displayed again (step S811). If the settings do not remain on the list, the processing routine advances to the ordinary process and the automatic job combining process is not executed.

By preliminarily adding the print settings upon job combination as a job attribute separately from the print settings of the document data in this manner, the proper print setting can be automatically selected upon job combination or the user can select the optimum print setting and the selected print setting can be applied.

According to the foregoing embodiment, on the user interface 700, the user is made to preset the print setting upon print job combination which is validated upon combination of the print jobs. Upon combination of the print jobs, the print jobs are combined on the basis of the print setting upon combination which has been set. Therefore, upon job combination, the job attribute of the optimum print setting can be added to the combined print job without changing the print setting by using the user interface.

Since it is also possible to list up the proper job attributes and notify the user of them, the job attribute of the optimum print setting can be easily added without changing many print settings.

In the above embodiments, the spool file manager 508 has automatically performed the combination check even if the job combining process is not specifically instructed from the user. However, after the job combining process was specifically instructed from the user interface 600 of the spool file manager 508, it is also possible to advance to the processes shown in the flowcharts of FIGS. 9 and 10 in which the print settings upon combination are applied.

Although the prohibition rule discrimination of the print settings has been made upon job combination in the embodiment, it is also possible to use a system in which an option of "print settings upon combination are forcedly applied" is provided for "print settings upon combination" and, when this option is valid, the job combination is performed without making the prohibition rule discrimination in the case of such a system, although there is a possibility that the layout is broken depending on the print job, if the system is in such an environment that the print job is formed in accordance with a format which has been predetermined by the users, ease of use of the user is enhanced.

The object of the invention is also accomplished by a method whereby a storing medium in which program codes of software for realizing the functions of the embodiments mentioned above have been recorded is supplied to a system or an apparatus and a computer (or a CPU, an MPU, or the like) of the system or apparatus reads out and executes the program codes stored in the storing medium.

In this case, the program codes themselves read out of the storing medium realize the functions of the embodiments mentioned above and the storing medium in which the program codes have been stored constructs the invention.

As a storing medium for supplying the program codes, for example, a floppy (registered trademark) disk, a hard disk, a magnetooptic disk, a CD-ROM, a CD-R, CD-RW, a DVD-ROM, a DVD±R, a DVD-RAM, a DVD±RW, a magnetic tape, a non-volatile memory card, a ROM, or the like can be used. The program codes can be also downloaded through a network.

The invention incorporates not only the case where the computer executes the read-out program codes, so that the functions of the embodiments mentioned above are realized but also the case where the OS (operating system) or the like which is operating on the computer executes a part or all of actual processes and the functions of the embodiments mentioned above are realized by those processes.

Further, the invention incorporates the case where the program codes read out of the storing medium are written into a memory provided for a function expanding board inserted in the computer or a function expanding unit connected to the computer, thereafter, a CPU or the like provided for the function expanding board or the function expanding unit executes a part or all of actual processes and the functions of the embodiments mentioned above are realized by those processes.

Naturally, the invention incorporates not only the case where the computer executes the read-out program codes, so that the functions of the embodiments mentioned above are realized but also the case where the OS or the like which is operating on the computer executes a part or all of actual processes and the functions of the embodiments mentioned above are realized by those processes.

In this case, the above program is directly provided from the storing medium in which such a program has been stored, or the program is provided by being downloaded from another computer (not shown) connected to the Internet, a commercially available network, a local area network, or the like, or from a database, or the like.

As many apparently widely different embodiments of the present invention can be made without departing from the spirit and scope thereof, it is to be understood that the invention is not limited to the specific embodiments thereof except as defined in the appended claims.

According to the invention, the print setting information which is applied when a plurality of jobs are combined into one job is previously added to the job attribute of such a job and, upon combination of the jobs, the job attribute of the job after the combination is set on the basis of the print setting information added to the job attribute. Therefore, upon job combination, the job attribute of the optimum print setting can be added to the combined job without changing the print settings by using the user interface.

This application claims priority from Japanese Patent Application No. 2005-080492 filed on Mar. 18, 2005, which is hereby incorporated by reference herein.

What is claimed is:

1. An information processing apparatus, comprising:
a setting unit adapted to set a plurality of print setting information to a first print job, each of the plurality of print setting information being composed of a plurality of setting values;
a first selection unit adapted to select the first print job and a second print job for job combination;
a specification unit adapted to specify a type of the second print job selected by the first selection unit;
a second selection unit adapted to select print setting information corresponding to the type of the second print job specified by the specification unit from among the plurality of print setting information; and
a combination unit adapted to combine the first print job with the second print job selected by the first selection unit based on the print setting information selected by the second selection unit,
wherein the type of the second print job is a type of an application on which the second print job was generated, a document name of the second print job, a user name of the second print job, a time or date on which the second print job was generated, or a combination thereof.

2. An apparatus according to claim 1, wherein the plurality of setting values include values on a print sheet and on a color attribute.

3. A job combining method performed by an information processing apparatus, comprising:
a setting step of setting a plurality of print setting information to a first print job, each of the plurality of print setting information being composed of a plurality of setting values;
a first selecting step of selecting the first print job and a second print job for job combination;
a specifying step of specifying a type of the second print job selected in the first selecting step;
a second selecting step of selecting print setting information corresponding to the type of the second print job specified in the specifying step from among the plurality of print setting information; and
a combination step of combining the first print job with the second print job selected by the first selecting step based on the print setting information selected by the second selecting step,
wherein the type of the second print job is a type of an application on which the second print job was generated, a document name of the second print job, a user name of the second print job, a time or date on which the second print job was generated, or a combination thereof, and
wherein the setting step, the first selecting step, the specifying step, the second selecting step, and the combination step are performed by the information processing apparatus.

4. A method according to claim 3, wherein the plurality of setting values include values on a print sheet and on a color attribute.

5. A non-transitory computer-readable medium storing a program comprising instructions that when executed by a computer in an information processing apparatus cause the information processing apparatus to perform a job combining method, the instructions comprising instructions for:
a setting step of setting a plurality of print setting information to a first print job, each of the plurality of print setting information being composed of a plurality of setting values;
a first selecting step of selecting the first print job and a second print job for job combination;
a specifying step of specifying a type of the second print job selected in the first selecting step;
a second selecting step of selecting print setting information corresponding to the type of the second print job specified in the specifying step from among the plurality of print setting information; and
a combination step of combining the first print job with the second print job selected by the first selecting step based on the print setting information selected by the second selecting step,
wherein the type of the second print job is a type of an application on which the second print job was generated, a document name of the second print job, a user name of the second print job, a time or date on which the second print job was generated, or a combination thereof.

6. A computer-readable medium according to claim 5, wherein the plurality of setting values include values on a print sheet and on a color attribute.

* * * * *